United States Patent Office 3,282,445
Patented Nov. 1, 1966

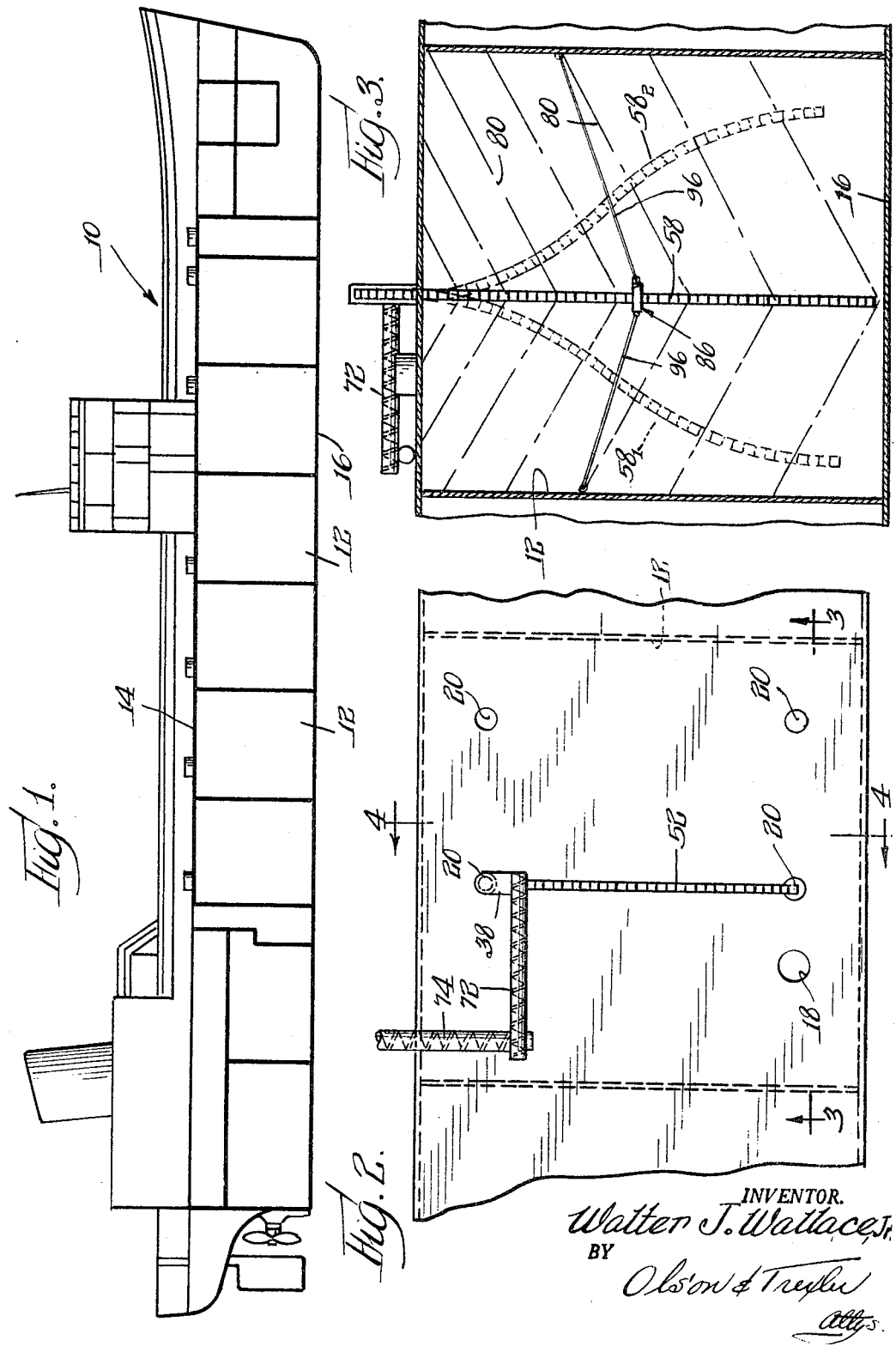

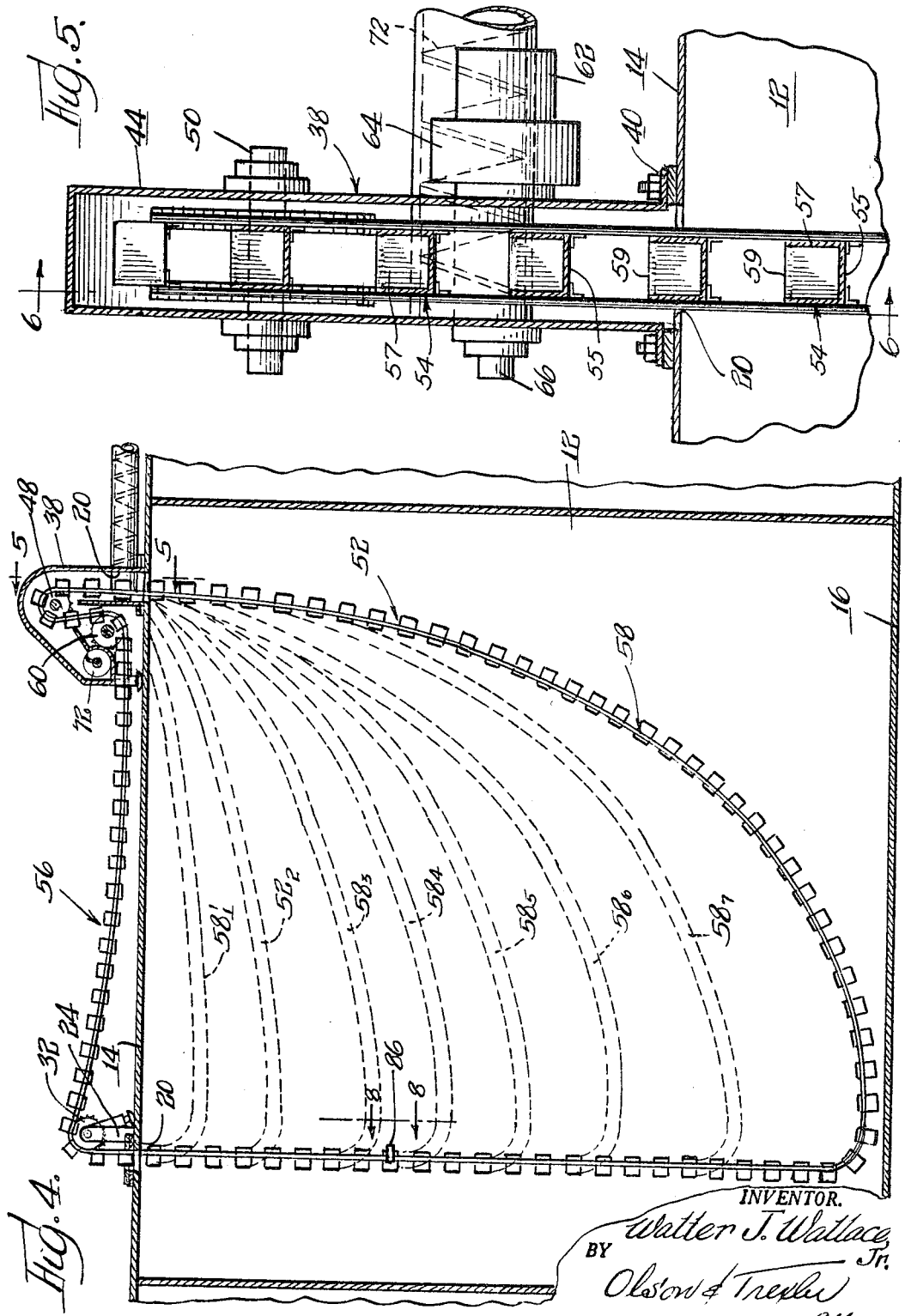

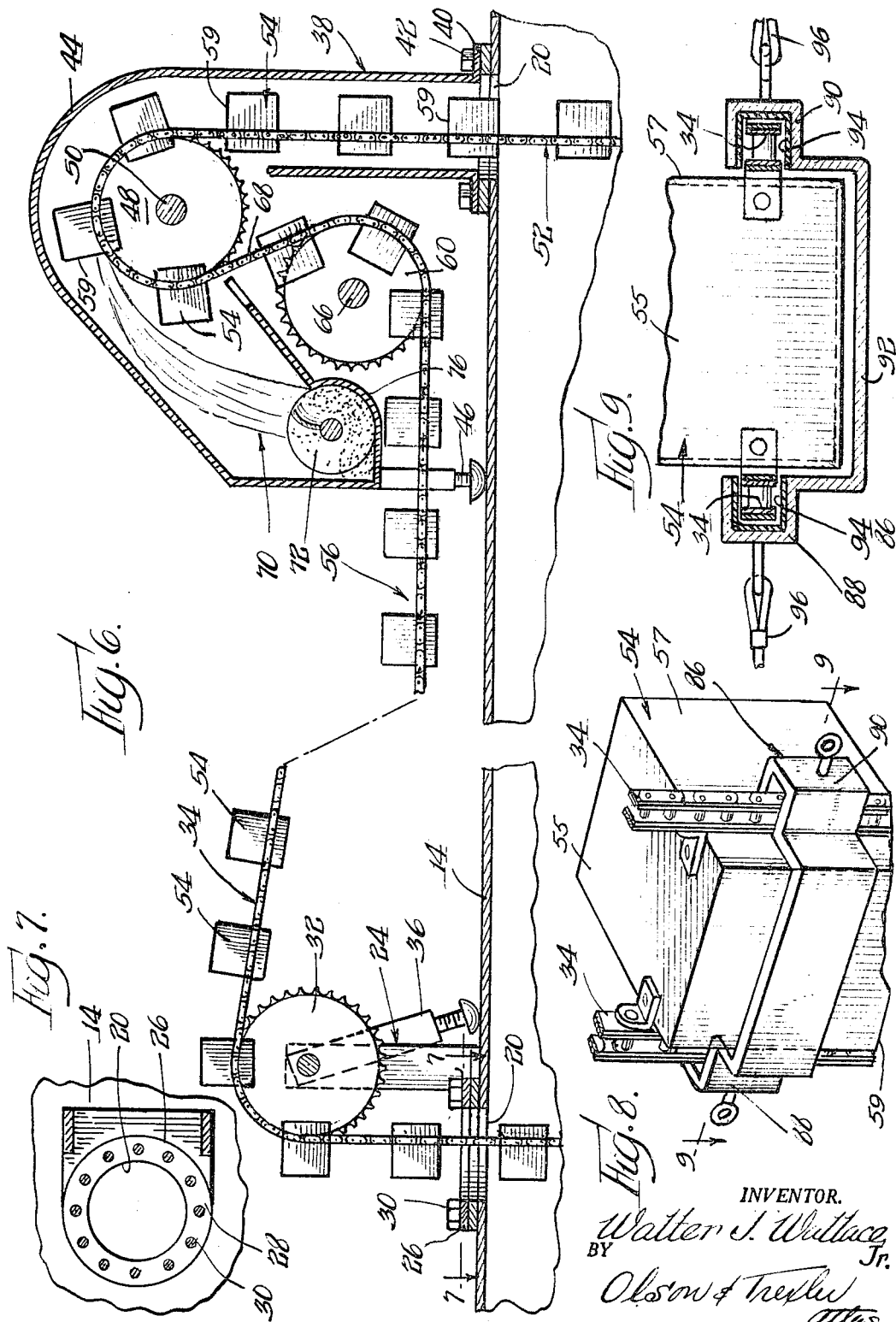

3,282,445
TANKER UNLOADING SYSTEM
Walter J. Wallace, Jr., Batavia, Ill., assignor to W. J. Wallace Systems, Inc., Batavia, Ill., a corporation of Delaware
Continuation of application Ser. No. 329,841, Dec. 11, 1963. This application Oct. 24, 1965, Ser. No. 512,038
12 Claims. (Cl. 214—15)

This application is a continuation of my co-pending application, Serial No. 329,841, filed December 11, 1963, now abandoned, which was a continuation of my application, Serial No. 50,657, filed August 19, 1960, now abandoned.

The present invention relates to the removing of undifferentiated bulk solid material from a mass of solid material and transferring the removed material to a new location spaced from the mass of solid material from which the material is removed.

One object of the invention is to provide a novel and advantageous method of digging undifferentiated solid material from a mass of solid material, suspending the solid material, and bearing the suspended material to a location spaced from the mass of solid material from which solid material is removed.

Another object is to provide a novel method of handling solid material, which employs an endless, flexible train of buckets in a novel and highly advantageous manner to dig undifferentiated solid material from a mass of solid material, suspend independently of the mass of solid material the material dug from the mass of solid material, and to bear the suspended material to a location spaced from the mass of solid material.

Another object is to provide new and highly advantageous solid material handling apparatus for digging undifferentiated solid material from a mass of solid material, suspending the removed material, bearing the suspended material away from the mass of solid material, and placing the removed material in a definite location spaced from the mass of solid material from which the material is removed.

Another object is to provide novel solid material handling apparatus which utilizes a flexible endless train of buckets in a novel manner and to great advantage to dig undifferentiated solid material from a mass of solid material, suspend the removed material, bear the removed material away from the mass of solid material, and dump the removed material in a definite location spaced from the mass of solid from which the material is removed.

Another object is to provide solid material handling apparatus of the character recited which functions in a new and improved manner to dig, suspend, and transfer solid material by means of a flexible endless train of buckets while at the same time being simplified to advantage by the elimination of structure and structural relationships previously used in endless bucket conveyers designed to dig, suspend, and transfer solid material.

Another object is to provide, for unloading flowable unloading marine vessel for transporting and unloading solid material.

Another object is to provide, for unloading flowable solid material from a compartment through the top of the compartment, new and improved conveying apparatus which effects unloading of the material by means of an endless flexible conveyer element which is directed in a loading path through the compartment only by the tension in the conveyer element, the weight of that portion of the conveyer element which extends through the compartment, and the reaction on the conveyer element of the material being unloaded.

Other objects and advantages will become apparent from the following description of the exemplary embodiment of the invention illustrated in the drawings, in which:

FIG. 1 is a longitudinal sectional view of a tanker ship from which flowable solid materials are unloaded in accordance with the invention;

FIG. 2 is a fragmentary plan view of the tanker deck showing the relationship to a tank of means provided by the invention for unloading the tank;

FIG. 3 is a vertical sectional view taken along the line 3—3 of FIG. 3;

FIG. 4 is a fragmentary sectional view of the tanker taken along the line 4—4 of FIG. 2;

FIG. 5 is a fragmentary sectional view on an enlarged scale, taken along the line 5—5 of FIG. 4;

FIG. 6 is a sectional view taken along the line 6—6 of FIG. 5;

FIG. 7 is a fragmentary detail view taken with reference to the line 7—7 of FIG. 6;

FIG. 8 is a fragmentary perspective view taken with reference to the line 8—8 of FIG. 4 and illustrating the relationship of a control runner to the endless conveyer element of the unloading apparatus; and FIG. 9 is a fragmentary sectional view taken along the line 9—9 of FIG. 8.

Referring to the drawings in greater detail, the vessel 10 illustrated in FIG. 1 is typical of ocean going tanker ships designed to carry liquid cargo in a plurality of closed tanks 12 which underlie the deck 14 of the ship. Normally, the cargo tanks 12 extend from the deck 14 down to the bottom 16 of the ship.

Ordinarily, the only openings into a cargo tank 12 are a single manhole opening 18 and a plurality of much smaller "Butterworth" openings 20 through the tanker deck 14. The manhole opening 18 is usually about 36 inches in diameter and is circled by a cylindrical shroud or well element which extends upwardly a substantial distance, normally about three feet, above the tanker deck. The Butterworth openings 20 usually have a diameter of approximately 12 inches and are designed to permit entry to steam cleaning equipment and the like down into the underlying tanks.

The limited access provided to each tank 12 through a single protective manhole 18, and through a number of small Butterworth openings 20 is adequate in the service for which such tanker ships are designed, i.e., the transport of liquid cargo.

Even though tanker ships constructed in this manner are designed to carry only a liquid cargo, it has been recognized that many economic advantages could be realized by transporting nonliquid bulk materials in tankers which were not in service carrying liquids.

While many types of cargo cannot be loaded into the tanks of these ships, it is not difficult to load the tanks with flowable solid materials, such for example, as grain, coal, cement, or other materials which have to a degree an ability to flow downhill so as to assume "an angle of repose" when placed in a pile. All such materials have to a degree an ability to flow in the same manner as loose sand, and for convenience in description in this application will be referred to as "flowable solid materials."

While the loading of such flowable solid materials into a tanker ship presents no particular problem, the unloading of the materials through the limited access openings in the tops of the tanks has been so impractical as to make it economically unfeasible to transport most materials of this character in tanker ships.

Because of unloading problems, about the only solid material which has been transported successfully in tanker ships is grain. It is possible to unload grain by means of suction equipment which is extended down into the tanks through the small access openings. This has been accomplished where special pneumatic unloading equipment is available at the dock, and has also been accomplished by portable suction equipment which is applied to tankers in port.

This expedient of unloading flowable solid materials from tankers has not only been limited as a practical matter to the unloading of grain, but is accompanied by many serious disadvantages. Ordinarily, such unloading operations are quite slow and expensive. Moreover, the unloading operation usually causes a severe contamination of the atmosphere with dust, creating unhealthful working conditions for the personnel and sometimes leading to hazardous conditions.

In accordance with the invention, flowable solid materials are unloaded from tanker ships in an improved manner which effects a rapid and extremely efficient unloading of substantially any flowable solid material through the conventional access openings in the tops of the individual tanks.

This is accomplished, as illustrated in the drawings, by circulating an endless flexible conveyer element through a tank to be unloaded in a manner such that a freely depending run of the flexible conveyer element entering a tank through one Butterworth opening and leaving the tank through another Butterworth opening is effectively loaded with the flowable solid material carried in the tank, merely as an incident to the application of tension forces to the run of the conveyer element which depends into the tank and without the necessity for otherwise supporting or guiding the conveyer run extending into the tank.

Having reference to the drawings, the portable tanker unloading apparatus provided by the invention and applied to the tanker ship 10 comprises a first pillow block or bracket 24 which is adapted to be mounted on the tanker deck 14 adjacent a Butterworth opening 20 overlying one side of a tank 12 to be unloaded. As shown, the pillow bracket 24 has a circular, laterally projecting base 26 adapted to encircle the underlying Butterworth opening and defining apertures 28 which receive stud bolts 30 projecting upwardly from the deck 14 in encircling relation to the opening 20. The bolts 30 are normally used to hold in place a cover (not shown) for the Butterworth opening. They form convenient means for bolting the pillow bracket 24 to the deck.

The pillow bracket 24 provides rotary support to a pair of spaced coaxial sprocket wheels 32 adapted to support an endless conveyer carrier element 34, as will be presently described. A swingable brace 36 of adjustable length engages the deck 14, as shown in FIG. 6, to support the pillow bracket 24 against the reaction of horizontal force in the carrier 34, as will presently appear.

A second pillow block or pillow unit 38 is designed to be secured to the tanker deck 14 in coacting relation to a second Butterworth opening 20 which has a horizontal spacing from the previously mentioned opening 20 coacting with the pillow bracket 24, which is equal to a major portion of the corresponding horizontal dimension of the underlying tank 12.

Thus, the pillow unit 38 includes an annular base 40 adapted to encircle an underlying Butterworth opening 20 and receive deck clamping bolts 42 which extend upwardly from the periphery of the opening. In this manner, the pillow blocks or pillow units 24, 38 are applied to two tanker deck openings spaced a substantial distance apart and opening downwardly into a common tank 12.

As shown, the pillow unit 38 comprises a heavy upright housing 44 which is oriented to extend toward the other pillow unit 24, and which, as shown, is braced by an auxiliary adjustable support 46 engaging the deck 14. A spaced pair of coaxial sprocket wheels 48 are journaled on an axle 50 in the upper portion of the housing 44.

A flexible bucket conveyer element 52, comprising a plurality of spaced conveyer buckets 54 supported on the previously mentioned endless carrier 34, is trained over the two pairs of sprocket wheels 32, 48, to form an upper conveyer run 56 extending between the two pillow units 24, 38, and to define a lower conveyer run 58 which depends from the sprocket wheel 32, 48 down through the two underlying Butterworth openings 20 to tend to form a catenary curve hanging below the tanker deck 14. Thus, it will be evident that the wheels 32 and 48 support the lower conveyer run 58 suspended between the wheels 32 and 48.

In the present instance, the endless carrier 34 is formed by a pair of similar sprocket chains, each designated by the number 34, which are trained over the respective wheels of the pairs of sprocket wheels 32, 48. The conveyer buckets 54 are supported between the endless sprocket chains 34, as shown. Each bucket 54 has a bottom 55 and a continuous peripheral sidewall 57 adjoining the bottom and defining for the bucket an open end 59 opening away from the bottom 55 outwardly in a direction generally parallel to the adjacent portion of the carrier 34. See FIGS. 5, 6, 8 and 9.

The links of the sprocket chains 34 have a conventional construction which permits ready disconnection and reconnection of the links to provide for the addition of links and buckets as necessary to produce any desired length in the endless conveyer element 52. As will presently appear, the conveyer element 52 is lengthened in successive steps as the pile of material in the underlying tank 12 is lowered, in the course of the unloading process.

The conveyer element 52 is circulated through a closed course by means of a pair of driving sprocket wheels 60 journaled in the conveyer unit 38 below the sprocket wheels 48. The sprocket wheels 60 are powered, in the present instance, by an electric motor 62, FIG. 5, which operates through gearing 64 on the pillow unit housing 44 to rotate a shaft 66 that turns the wheels 60.

It will be noted, with reference to FIG. 6, that the sprocket wheels 60 are located below and in somewhat underlying relation to the sprocket wheels 48, so that the short run 68 of the endless carrier 38, moving from the wheels 48 to the wheels 60 extends back under the wheels 48, as shown. This provides compactness in the construction of the pillow unit 38, while at the same time providing for inversion and dumping of the buckets 54 on that portion of the endless carrier 34 passing over the wheels 48 and extending down toward the wheels 60. The wheels 60, positioned in relation to the wheels 48 as described and as shown in FIG. 6, serve to depress the adjacent portion of the endless carrier 38 so that the short run or running segment 68 of the carrier 38 extends steeply downwardly from the upper portions of the periphery of the wheels 48 to the lower portion of wheels 60. It will be understood that the conveyer element 52 is circulated in a counterclockwise direction with reference to FIG. 4 to lift the loaded buckets 54 up to the pillow unit 48 where they are unloaded. Hence, with reference to the drawings, the wheels 48 support the dynamically rising end of the lower conveyer element run 58, in which a running portion of the conveyer element 52 rises toward said wheels 48, and the wheels 32 support the dynamically descending end of the lower conveyer element run 58, in which a running portion of the conveyer element 52 descends from said wheels 48. Circulation of the conveyer element 52 in the direction described causes the loaded buckets 54 passing over the top of the wheels 48 to pass immediately into the short run 68 of the course of the buckets in the upper run 56 of the conveyer element. For convenience in description, the short run 68 referred to will be designated as the bucket unloading segment of the upper conveyer element run 56. Movement of the loaded buckets 54 into the bucket unloading segment 68 of the upper run turns the buckets to open downwardly and empties the buckets of solid material.

Inversion of the conveyer buckets 54 passing through the pillow unit 38 dumps the material being unloaded from the buckets into an unloading station 70 in the pillow unit, where it is directed onto a laterally extending transfer auger 72. A support member 76 for the material underlies the auger 72 in the pillow unit 38 and extends upwardly over the sprocket wheels 60, as shown in FIG. 6, to catch the material being discharged from the buckets. The auger 72 extends laterally away from a vertical medial plane through the support wheels 32 and 48, FIGS. 5 and 6, and operates to transfer laterally away from said plane solid material dumped in said unloading station 70 by loaded buckets passing over said support wheels 48.

It will be understood that the material which is unloaded from the buckets 54 can be carried away from the pillow unit 38 in any suitable manner. The auger 72, shown for purposes of illustration, carries the material from the unit 38 across the deck 14 to a second auger 74 which carries the material over the side of the ship to any suitable conveying apparatus on the dock.

The manner in which the lower run 58 of the flexible conveyer element 52 operates in a tank 12 to load the buckets 54 with the material to be unloaded is especially significant. Supported at its opposite ends by the sprocket wheels 32, 48, the lower conveyer run 58 depends down through the two Butterworth openings 20 being used and tends to form a catenary curve between these openings, as previously intimated.

When the unloading operation begins, the tank 12 to be unloaded is ordinarily filled to a level near the deck 14. It will be understood that the conveyer element 52 is formed by conveyer buckets and carrier links which are secured together and threaded through the two Butterworth openings being used. Thus, buckets and carrier links are connected together to provide a conveyer element having a length sufficient to cause the lower run 58 of the carrier element to come into contact with the underlying pile of material to be unloaded along a substantial portion of the length of the lower conveyer run. As the conveyer buckets move through that portion of the lower conveyer run which is engaged and supported by the underlying pile of material, the buckets are dragged through the material by tension in the conveyer element, while being held in contact with the material by the weight of the buckets and the adjacent links of the carrier 34. The effect of this is to fill the individual buckets with material as they move across the pile of material toward the pillow unit 38.

It has been found that the buckets are loaded very effectively with material in this manner, even though the lower run 58 of the conveyer element is completely free to move in any direction in the vertical plane of the conveyer element. Consequently, it is unnecessary to provide any supporting structure within the tank to coact with the lower run 58 of the carrier element in order to effectively fill the conveyer element buckets passing through the tank.

The removal of material by the conveyer element 52 tends to dig a trench in the pile of material being unloaded. However, the material, by virtue of its flowable character, will of its own accord slide down toward this trench until the material on opposite sides of the trench has an angle of repose which is characteristic of the material. The angle of repose of the material lying on opposite sides of the conveyer element 52 as the material is unloaded is represented by the lines 80 in FIG. 3.

As the level of the material within the tank 12 is lowered, the conveyer element 52 is lengthened in successive steps by the addition of more buckets and carrier links. The successive additions to the length of the carrier element 52 as unloading progresses causes the lower run 58 of the carrier element to assume different positions which are identified for purposes of illustration by the numbers $58_1$ to $58_7$ in FIG. 4.

This unloading procedure progresses with great efficiency and rapidity until the conveyer element 52 reaches the bottom of the tank 12. The material remaining in the tank 12 and lying on opposite sides of the conveyer element can be easily moved over to the path of the conveyer element 52 by auxiliary unloading apparatus, such, for example, as portable augers of small size which can be lowered down in the tank through a manhole 18. This is a relatively simple operation which can be carried out by means of simple conveying and clean-up apparatus which need not be described here.

If desired, the amount of material which must be shifted by the clean-up apparatus can be reduced by swinging the conveyer run 58 laterally to opposite sides of its normal path, as indicated in dotted lines in FIG. 3.

This is accomplished near the end of an unloading operation by use of a guide runner 86 which is applied to the carrier chains 34, as illustrated in FIGS. 3, 8 and 9.

The guide runner, shown for purposes of illustration, comprises two U-shaped elements 88, 90 facing toward each other in embracing relation to the respective sprocket chains 34. These elements 88, 90 are connected together by a common bridge member 92 which is laterally offset to provide clearance for the buckets 54. As shown, the elements 88, 90 are protected from wear by means of inserts 94 which face the chains 34. These inserts can be formed of Teflon, or other wear-resistant material.

Tension elements 96 attached to the runner 86 can be used to swing the lower conveyer element run 58 from its normal position toward either of two laterally disposed positions, identified by the numbers $58_1$ and $58_2$ while the conveyor element continues to run freely through the runner. The lateral force applied by the runner 86 to the conveyer element run 58 to effect unloading of material located at either side of the normal position of the conveyer element does not restrain the lower run of the conveyer element against movement in any direction in the vertical plane of the conveyer element.

It will be appreciated that the present invention is not necessarily limited to use of the particular apparatus illustrated, but includes the use of variants and alternatives within the scope of the invention as defined by the claims.

I claim:

1. A self unloading marine vessel,
   comprising the combination of a flotation hull having wall means therein defining a cargo space for holding solid material,
   a deck on said hull overlying said cargo space and having first and second horizontally spaced openings therein,
   an endless flexible conveying element including an endless train of buckets each having a bottom and a continuous peripheral side wall adjoining the bottom,
   each bucket having an open end facing in a direction generally parallel to the adjacent portion of the conveying element,
   first and second support wheels,
   first and second support means mounted on said deck journalling said respective support wheels for rotation about generally parallel and generally horizontal axes above said deck and adjacent said deck openings,
   said endless flexible conveying element being trained over said first and second support wheels to have an upper run disposed above said deck and extending between said first and second support wheels and to to have a lower run extending downwardly from said second support wheel through said second deck opening into said cargo space and then curving upwardly and extending through said first deck opening to said first wheel,
   power driving means interconnected with said flexible conveying element to circulate said conveying element in a predetermined direction to travel downwardly from said second wheel into said cargo space and then upwardly to said first wheel, said buckets being oriented on said endless conveying
element with the open ends of said buckets facing
in the direction of travel,
a third wheel,
means journalling said third wheel above said deck
for rotation about an axis generally parallel to the
axes of said first and second wheels,
said third wheel being positioned between said first
and second wheels but closer to said first wheel,
said upper run of said endless conveying element being trained under said third wheel so that a running portion of the endless conveying element extends downwardly at a steep angle between said
first and third wheels to invert and dump said buckets,
and solid material receiving means positioned above
said deck adjacent said first wheel for receiving the
material dumped from said buckets,
the lower run of said conveying element being freely
suspended between said first and second wheels and
being spaced substantially away from said wall means
of said cargo space for causing the buckets along
means of said cargo space for causing the buckets
along said lower run to dig into the solid material
solely by the gross weight of said conveying element
and the tension therein,
the portion of said lower run disposed below said deck
being free to flex and move vertically and horizontally
in any direction so that said conveying element is
entirely free to conform itself to the shape of the
the solid material in said cargo space as the conveying element is dragged along the solid material.

2. A self unloading marine vessel,
comprising the combination of a flotation hull having
wall means therein defining a cargo space for holding
solid material,
a deck on said hull overlying said cargo space and
having first and second horizontally spaced openings
therein,
an endless flexible conveying element including an endless train of buckets each having a bottom and a
continuous peripheral side wall adjoining the bottom,
each bucket having an open end facing in a direction
generally parallel to the adjacent portion of the conveying element,
first and second support wheels,
first and second support means mounted on said deck
and journalling said respective support wheels for
rotation about generally parallel and generally horizontal axes above said deck and adjacent said deck
openings,
said endless flexible conveying element being trained
over said first and second support wheels to have an
upper run disposed above said deck and extending
between said first and second support wheels and
to have a lower run extending downwardly from
said second support wheel through said second deck
opening into said cargo space and then curving upwardly and extending through said first deck open-
to said first wheel,
power driving means interconnected with said flexible
conveying element to circulate said conveying element in a predetermined direction to travel downwardly from said second wheel into said cargo space
and then upwardly to said first wheel,
said buckets being oriented on said endless conveying
element with the open ends of said buckets facing
in the direction of travel,
conveying element depressing means mounted above
said deck and located substantially below the level
of the uppermost portion of said first wheel,
said depressing means being located between said first
and second wheels but closer to said first wheel,
said upper run of said endless conveying element being
trained under said depressing means so that a running portion of the endless conveying element extends downwardly at a steep angle between said
first wheel and said depressing means to invert and
dump said buckets,
and solid material receiving means positioned above
said deck adjacent said first wheel for receiving the
material dumped from said buckets,
the lower run of said conveying element being freely
suspended between said first and second wheels and
being spaced substantially away from said wall means
of said cargo space for causing the buckets along
said lower run to dig into the solid material solely
by the gross weight of said conveying element and
the tension therein,
at least the lower portion of said lower run constituting a major fraction thereof being free to flex and
move vertically and horizontally in any direction so
that said conveying element is entirely free to conform itself to the shape of the solid material in said
cargo space as the conveying element is dragged
along the solid material.

3. A self unloading marine vessel,
comprising the combination of a flotation hull having
wall means therein defining a cargo space for holding solid material,
a deck on said hull overlying said cargo space and having first and second horizontally spaced openings
therein,
an endless flexible conveying element including an endless train of buckets each having a bottom and a
continuous peripheral side wall adjoining the bottom,
each bucket having an open end facing in a direction
generally parallel to the adjacent portion of the conveying element,
first and second support wheels,
first and second support means mounted on said deck
and journalling said respective support wheels for
rotation about generally parallel and generally horizontal axes above said deck and adjacent said deck
openings,
said endless flexible conveying element being trained
over said first and second support wheels to have an
upper run disposed above said deck and extending
between said first and second support wheels and
to have a lower run extending downwardly from said
second support wheel through said second deck opening into said cargo space and then curving upwardly
and extending through said first deck opening to
said first wheel,
power driving means interconnected with said flexible
conveying element to circulate said conveying element in a predetermined direction to travel downwardly from said second wheel into said cargo space
and then upwardly to said first wheel,
said buckets being oriented on said endless conveying
element with the open ends of said buckets facing
in the direction of travel,
conveying element depressing means mounted above
said deck and located substantially below the level
of the uppermost portion of said first wheel,
said depressing means being located between said first
and second wheels but closer to said first wheel,
said upper run of said endless conveying element being trained under said depressing means so that a
running portion of the endless conveying element extends downwardly at a steep angle between said
first wheel and said depressing means to invert and
dump said buckets,
solid material receiving means positioned above said
deck adjacent said first wheel for receiving the material dumped from said buckets,
the lower run of said conveying element being suspended solely between said first and second wheels
and being spaced substantially away from said wall
means of said cargo space for causing the buckets
along said lower run to dig into the solid material solely by the gross weight of said conveying element and the tension therein,
a guide member slidably engaging said endless conveying element below said deck but above the level of the solid material in said cargo space, and a pair of tension elements extending laterally in opposite directions from said guide member for displacing said guide member laterally from the plane of said first and second support wheels,
said conveying element thereby being displaced laterally within said cargo space,
at least the lower portion of said lower run constituting a major fraction thereof being free to flex and move vertically and horizontally in any direction so that said conveying element is entirely free to conform itself to the shape of the solid material in said cargo space as the conveying element is dragged along the solid material.

4. Solid material handling apparatus for digging into a mass of solid material, removing solid material therefrom, suspending the removed material, bearing the removed material away from the mass of solid material, and placing the removed material in loose form in a location spaced from said mass of solid material,
said apparatus comprising the combination of an endless flexible conveying element including an endless train of buckets each having a bottom and a continuous peripheral side wall adjoining the bottom,
each bucket having an open end facing in a direction generally parallel to the adjacent portion of the conveying element,
first and second support wheels journalled for rotation about generally parallel and generally horizontal axes which are spaced apart horizontally by an amount exceeding the diameter of each of said wheels,
said endless flexible conveying element being trained over said first and second support wheels to have an upper run extending therebetween and a lower run suspended between said wheels,
said lower run having substantial slack and extending along a curved path between said wheels,
power driving means interconnected with said flexible conveying element to circulate said conveying element in a predetermined direction extending downwardly from said second wheel and upwardly to said first wheel,
said buckets being oriented on said endless conveying element with the open ends of said buckets facing in the direction of travel,
a third wheel journalled for rotation about an axis generally parallel to the axes of said first and second wheels,
said third wheel being positioned between said first and second wheels but closer to said first wheel,
said upper run of said endless conveying element being trained under said third wheel so that a running portion of said endless conveying element extends downwardly at a steep angle between said first and third wheels to invert and dump said buckets,
and solid material receiving means positioned adjacent said first wheel for receiving the material dumped from said buckets,
the lower run of said conveying element being freely suspended between said first and second wheels for causing the buckets along said lower run to dig into the mass of solid material solely by the gross weight of said conveying element and the tension therein,
the lower run of said endless conveying element being free to flex and move vertically and horizontally in any direction so that said conveying element is entirely free to conform itself to the shape of the mass of solid material as the conveying element is dragged therealong.

5. Solid material handling apparatus for digging into a mass of solid material, removing solid material therefrom, suspending the removed material, bearing the removed material away from the mass of solid material, and placing the removed material in loose form in a location spaced from said mass of solid material,
said apparatus comprising the combination of an endless flexible conveying element including an endless train of buckets each having a bottom and an effectively continuous peripheral side wall adjoining the bottom,
each bucket having an open end facing in a direction generally parallel to the adjacent portion of the conveying element,
first and second support wheels journalled for rotation about generally parallel and generally horizontal axes which are spaced apart horizontally by an amount exceeding the diameter of each of said wheels,
said endless flexible conveying element being trained over said first and second support wheels to have an upper run extending therebetween and a lower run suspended between said wheels,
said lower run having substantial slack and extending along a curved path between said wheels,
power driving means interconnected with said flexible conveying element to circulate said conveying element in a predetermined direction extending downwardly from said second wheel and upwardly to said first wheel,
said buckets being oriented on said endless conveying element with the open ends of said buckets facing in the direction of travel,
conveying element depressing means located between said first and second wheels but closer to said first wheel and substantially below the level of the uppermost portion of said first wheel,
said upper run of said endless conveying element being trained under said depressing means so that a running portion of the endless conveying element extends downwardly at a steep angle between said first wheel and said depressing means to invert and dump said buckets,
and solid material receiving means positioned adjacent said first wheel for receiving the material dumped from said buckets,
the lower run of said conveying element being freely suspended between said first and second wheels for causing the buckets along said lower run to dig into the mass of solid material solely by the gross weight of said conveying element and the tension therein,
the lower run of said endless conveying element being free to flex and move vertically and horizontally in any direction so that said conveying element is entirely free to conform itself to the shape of the mass of solid material as the conveying element is dragged therealong.

6. Solid material handling apparatus for digging into a mass of solid material, removing solid material therefrom, suspending the removed material, bearing the removed material away from the mass of solid material, and placing the removed material in loose form in a location spaced from said mass of solid material,
said apparatus comprising the combination of an endless flexible conveying element including an endless train of buckets each having a bottom and a continuous peripheral side wall adjoining the bottom,
each bucket having an open end facing in a direction generally parallel to the adjacent portion of the conveying element,
first and second support wheels journalled for rotation about generally parallel and generally horizontal axes which are spaced apart horizontally by an amount exceeding the diameter of each of said wheels,
said endless flexible conveying element being trained over said first and second support wheels to have an upper run extending therebetween and a lower run suspended between said wheels, said lower run having substantial slack and extending along a curved path between said wheels, power driving means interconnected with said flexible conveying element to circulate said conveying element in a predetermined direction extending downwardly from said second wheel and upwardly to said first wheel, said buckets being oriented on said endless conveying element with the open ends of said buckets facing in the direction of travel, a third wheel journalled for rotation about an axis generally parallel to the axes of said first and second wheels, said third wheel being positioned between said first and second wheels but closer to said first wheel, said upper run of said endless conveying element being trained under said third wheel so that a running portion of said endless conveying element extends downwardly at a steep angle between said first and third wheels to invert and dump said buckets, solid material receiving means positioned adjacent said first wheel for receiving the material dumped from said buckets, the lower run of said conveying element being freely suspended between said first and second wheels for causing the buckets along said lower run to dig into the mass of solid material solely by the gross weight of said conveying element and the tension therein, a guide member engaging the lower run of said endless conveying element below said second wheel but substantially above the lowermost portion of said lower run, and means connected to said guide member for displacing said guide member laterally from the vertical plane of said first and second wheels, said lower run of said conveying element thereby being displaced laterally, at least the lower portion of said lower run constituting a major fraction thereof being free to flex and move vertically and horizontally in any direction so that said conveying element is entirely free to conform itself to the shape of the mass of solid material as the conveying element is dragged along such mass.

7. Solid material handling apparatus for digging into a mass of solid material, removing solid material therefrom, suspending the removed material, bearing the removed material away from the mass of solid material, and placing the removed material in loose form in a location spaced from said mass of solid material, said apparatus comprising the combination of an endless flexible conveying element including an endless train of buckets each having a bottom and a continuous peripheral side wall adjoining the bottom, each bucket having an open end facing in a direction generally parallel to the adjacent portion of the conveying element, first and second support wheels journalled for rotation about generally parallel and generally horizontal axes which are spaced apart horizontally by an amount exceeding the diameter of each of said wheels, said endless flexible conveying element being trained over said first and second support wheels to have an upper run extending therebetween and a lower run suspended between said wheels, said lower run having substantial slack and extending along a curved path between said wheels, power driving means interconnected with said flexible conveying element to circulate said conveying element in a predetermined direction extending downwardly from said second wheel and upwardly to said first wheel, said buckets being oriented on said endless conveying element with the open ends of said buckets facing in the direction of travel, a third wheel journalled for rotation about an axis generally parallel to the axes of said first and second wheels, said third wheel being positioned between said first and second wheels but closer to said first wheel, said upper run of said endless conveying element being trained under said third wheel so that a running portion of said endless conveying element extends downwardly at a steep angle between said first and third wheels to invert and dump said buckets, and solid material receiving means positioned adjacent said first wheel for receiving the material dumped from said buckets, said solid material receiving means including means for moving the dumped solid material laterally away from the vertical plane of said first and second support wheels, the lower run of said conveying element being freely suspended between said first and second wheels for causing the buckets along said lower run to dig into the mass of solid material solely by the gross weight of said conveying element and the tension therein, the lower run of said endless conveying element being free to flex and move vertically and horizontally in any direction so that said conveying element is entirely free to conform itself to the shape of the mass of solid material as the conveying element is dragged therealong.

8. Solid material handling apparatus for digging into a mass of solid material, removing solid material therefrom, suspending the removed matreial, bearing the removed material away from the mass of solid material, and placing the removed material in loose form in a location spaced from said mass of solid material, said apparatus comprising the combination of an endless flexible conveying element including an endless train of buckets each having a bottom and a continuous peripheral side wall adjoining the bottom, each bucket having an open end facing in a direction generally parallel to the adjacent portion of the conveying element, first and second support wheels journalled for rotation about generally parallel and generally horizontal axes which are spaced apart horizontally by an amount exceeding the diameter of each of said wheels, said endless flexible conveying element being trained over said first and second support wheels to have an upper run extending therebetween and a lower run suspended between said wheels, said lower run having substantial slack and extending along a curved path between said wheels, power driving means interconnected with said flexible conveying element to circulate said conveying element in a predetermined direction extending downwardly from said second wheel and upwardly to said first wheel, said buckets being oriented on said endless conveying element with the open ends of said buckets facing in the direction of travel, bucket unloading means located between said first and second wheels but closer to said first wheel to empty solid material from the loaded buckets passing over said first wheel, and solid material receiving means positioned adjacent said bucket unloading means for receiving the material emptied from said buckets, the lower run of said conveying element being freely suspended between said first and second wheels for causing the buckets along said lower run to dig into the mass of solid material solely by the gross weight of said conveying element and the tension therein, the lower run of said endless conveying element being free to flex and move vertically and horizontally in any direction so that said conveying element is entirely free to conform itself to the shape of the mass of solid material as the conveying element is dragged therealong.

9. Solid material handling apparatus for digging into a mass of solid material, removing solid material therefrom, suspending the removed material, bearing the removed material away from the mass of solid material, and placing the removed material in loose form in a location spaced from said mass of solid material, said apparatus comprising the combination of an endless flexible conveying element including an endless train of buckets each having a bottom and a continuous peripheral side wall adjoining the bottom, each bucket having an open end facing in a direction generally parallel to the adjacent portion of the conveying element, a receptacle including wall means for holding a mass of solid material, first and second support wheels journalled for rotation about generally parallel and generally horizontal axes which are spaced apart horizontally by an amount exceeding the diameter of each of said wheels, said wheels being located above said receptacle, said endless flexible conveying element being trained over said first and second support wheels to have an upper run extending therebetween and a lower run suspended between said wheels, said lower run having substantial slack and extending downwardly into said receptacle along a curved path between said wheels, power driving means interconnected with said flexible conveying element to circulate said conveying element in a predetermined direction extending downwardly from said second wheel and upwardly to said first wheel, said buckets being oriented on said endless conveying element with the open ends of said buckets facing in the direction of travel, a third wheel journalled for rotation about an axis generally parallel to the axes of said first and second wheels, said third wheel being positioned between said first and second wheels but closer to said first wheel, said upper run of said endless conveying element being trained under said third wheel so that a running portion of said endless conveying element extends downwardly at a steep angle between said first and third wheels to invert and dump said buckets, and solid material receiving means positioned adjacent said first wheel for receiving the material dumped from said buckets, the lower run of said conveying element being freely suspended between said first and second wheels and being spaced substantially away from said wall means of said receptacle for causing the buckets along said lower run to dig into the solid material solely by the gross weight of said conveying element and the tension therein, the lower run of said endless conveying element being free to flex and move vertically and horizontally in any direction so that said conveying element is entirely free to conform itself to the shape of the mass of solid material in said receptacle as the conveying element is dragged along such mass.

10. Solid material handling apparatus for digging into a mass of solid material, removing solid material therefrom, suspending the removed material, bearing the removed material away from the mass of solid material, and placing the removed material in loose form in a location spaced from said mass of solid material, said apparatus comprising the combination of an endless flexible conveying element including an endless train of buckets each having a bottom and a continuous peripheral side wall adjoining the bottom, each bucket having an open end facing in a direction generally parallel to the adjacent portion of the conveying element, a receptacle including wall means for holding a mass of solid material, first and second support wheels journalled for rotation about generally parallel and generally horizontal axes which are spaced apart horizontally by an amount exceeding the diameter of each of said wheels, said wheels being located above said receptacle, said endless flexible conveying element being trained over said first and second support wheels to have an upper run extending therebetween and a lower run suspended between said wheels, said lower run having substantial slack and extending downwardly into said receptacle along a curved path between said wheels, power driving means interconnected with said flexible conveying element to circulate said conveying element in a predetermined direction extending downwardly from said second wheel and upwardly to said first wheel, said buckets being oriented on said endless conveying element with the open ends of said buckets facing in the direction of travel, a third wheel journalled for rotation about an axis generally parallel to the axes of said first and second wheels, said third wheel being positioned between said first and second wheels but closer to said first wheel, said upper run of said endless conveying element being trained under said third wheel so that a running portion of said endless conveying element extends downwardly at a steep angle between said first and third wheels to invert and dump said buckets, solid material receiving means positioned adjacent said first wheel for receiving the material dumped from said buckets, a guide member engaging said endless conveying element below said second wheel but above the level of the solid material in said receptacle, and means connected to said guide member for shifting said guide member laterally and thereby displacing said lower run of said conveying element laterally from the plane of said first and second wheels, the lower run of said conveying element being freely suspended between said first and second wheels and being spaced substantially away from said wall means of said receptacle for causing the buckets along said lower run to dig into the solid material solely by the gross weight of said conveying element and the tension therein, at least the lower portion of said lower run constituting a major fraction thereof being free to flex and move vertically and horizontally in any direction so that said conveying element is entirely free to conform itself to the shape of the mass of solid material in said receptacles as the conveying element is directed along said mass.

11. A method of digging solid material from a mass thereof, suspending the solid material, and bearing the suspended material to a location spaced from the mass of solid material, said method comprising the steps of providing an endless train of buckets, providing first and second horizontally spaced support wheels having parallel and horizontal axes, training said endless train of buckets around said support wheels to provide a lower run of buckets extending along a freely hanging curve between said wheels, circulating said endless train of buckets around said wheels, engaging said lower run of buckets with a mass of solid material and thereby dragging the lower run of buckets along the solid material, emptying the buckets adjacent said first wheel, and continuously maintaining said lower run of buckets in a freely suspended condition for free flexing movement in all horizontal and vertical directions and thereby causing the buckets to dig into the mass of solid material solely by the gross weight of said train of buckets and the tension therein, whereby the train of buckets is entirely free to conform itself to the shape of the solid material as the buckets are dragged along the mass of solid material.

12. A method of digging solid material from a mass thereof, suspending the solid material, and bearing the suspended material to a location spaced from the mass of solid material, said method comprising the steps of providing an endless train of buckets, providing first and second horizontally spaced support wheels having parallel and horizontal axes, training said endless train of buckets around said support wheels to provide a lower run of buckets extending along a freely hanging curve between said wheels, circulating said endless train of buckets around said wheels, engaging said lower run of buckets with a mass of solid material and thereby dragging the lower run of buckets along the solid material, emptying the buckets adjacent said first wheel, continuously maintaining said lower run of buckets in a freely suspended condition for free flexing movement in all horizontal and vertical directions and thereby causing the buckets to dig into the mass of solid material solely by the gross weight of said train of buckets and the tension therein, whereby the train of buckets is entirely free to conform itself to the shape of the solid material as the buckets are dragged along the mass of solid material, and laterally shifting said lower run of buckets relative to said support wheels and thereby moving said lower run of buckets laterally relative to the mass of solid material.

References Cited by the Examiner

UNITED STATES PATENTS

| | | |
|---|---|---|
| 197,296 | 11/1877 | Stokes. |
| 283,189 | 8/1883 | Bardeen _____ 214—15 X |
| 775,686 | 11/1904 | Smith _____ 37—69 X |
| 858,180 | 6/1907 | Hetzel _____ 214—15 X |
| 1,164,934 | 12/1915 | Dull. |
| 1,332,426 | 3/1920 | Cole _____ 214—16 X |
| 1,530,647 | 3/1925 | Carlyle _____ 214—15 X |
| 2,941,668 | 6/1960 | Maus _____ 198—141 X |

FOREIGN PATENTS

| | | |
|---|---|---|
| 279,147 | 10/1930 | Italy. |
| 25,456 | 1/1915 | Norway. |

GERALD M. FORLENZA, *Primary Examiner.*

R. G. SHERIDAN, *Assistant Examiner.*

UNITED STATES PATENT OFFICE
CERTIFICATE OF CORRECTION

Patent No. 3,282,445 November 1, 1966

Walter J. Wallace, Jr.

It is hereby certified that error appears in the above numbered patent requiring correction and that the said Letters Patent should read as corrected below.

Column 1, line 59, for "provide, for unloading flowable" read -- provide a new and improved self- --.

Signed and sealed this 5th day of September 1967.

(SEAL)
Attest:

ERNEST W. SWIDER
Attesting Officer

EDWARD J. BRENNER
Commissioner of Patents